(12) United States Patent
Nakamura et al.

(10) Patent No.: US 9,180,926 B2
(45) Date of Patent: Nov. 10, 2015

(54) INVERTED PENDULUM TYPE MOVING BODY HAVING VELOCITY PLANNING DEVICE

(75) Inventors: Ryosuke Nakamura, Tokyo (JP); Azusa Amino, Tokyo (JP); Taishi Ueda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/125,192

(22) PCT Filed: Jul. 13, 2011

(86) PCT No.: PCT/JP2011/066010
§ 371 (c)(1),
(2), (4) Date: Dec. 10, 2013

(87) PCT Pub. No.: WO2013/001658
PCT Pub. Date: Jan. 3, 2013

(65) Prior Publication Data
US 2014/0114559 A1    Apr. 24, 2014

(30) Foreign Application Priority Data
Jun. 28, 2011  (WO) .................. PCT/JP2011/064832

(51) Int. Cl.
*G05D 1/08* (2006.01)
*G01M 1/12* (2006.01)
(Continued)

(52) U.S. Cl.
CPC ................ *B62K 3/007* (2013.01); *G05D 1/024* (2013.01); *G05D 1/0891* (2013.01); *B62B 1/10* (2013.01); *B62B 5/0069* (2013.01); *B62B 2301/00* (2013.01)

(58) Field of Classification Search
USPC ................. 701/1, 124; 280/205, 220, 47.131, 280/47.32; 180/7.1
See application file for complete search history.

(56) References Cited

U.S. PATENT DOCUMENTS 5,355,064 A * 10/1994 Yoshino et al. .......... 318/568.12
6,799,649 B2 * 10/2004 Kamen et al. .................. 180/8.2
(Continued)

FOREIGN PATENT DOCUMENTS

JP   5-181537 A   7/1993
JP   2000-52985 A   2/2000
(Continued)

OTHER PUBLICATIONS

International Search Report dated Oct. 18, 2011 w/ English translation (two (2) pages).
(Continued)

*Primary Examiner* — Yonel Beaulieu
(74) *Attorney, Agent, or Firm* — Crowell & Moring LLP

(57) ABSTRACT

The present invention provides an inverted pendulum-type moving body having a pair of wheels suspended from the moving body, using a floor as a traveling plane, and is provided on the same plane vertical to its travelling direction, a driving mechanism for rotating these wheels, posture measurement means for measuring an inclination angular velocity of its upper body that a straight line connecting a center-of-gravity position of a body of the moving body and an axle of the one pair of wheels makes with a vertical direction, and a mechanism control part for maintaining an inverted state of the moving body by controlling the driving mechanism, by having a velocity planning device for performing a movement plan so that the upper body angular velocity and the upper body angle may be in a relationship of quadratic function when a velocity change is needed.

4 Claims, 8 Drawing Sheets

(51) Int. Cl.
*G01M 1/14* (2006.01)
*B62K 3/00* (2006.01)
*G05D 1/02* (2006.01)
*B62B 5/00* (2006.01)
*B62B 1/10* (2006.01)

(56) References Cited

U.S. PATENT DOCUMENTS

| | | | |
|---|---|---|---|
| 7,200,482 B2 * | 4/2007 | Kawarasaki | 701/97 |
| 7,762,569 B2 * | 7/2010 | Fraser | 280/205 |
| 7,900,725 B2 * | 3/2011 | Heinzmann et al. | 180/65.1 |
| 8,170,780 B2 * | 5/2012 | Field et al. | 701/124 |
| 8,219,308 B2 * | 7/2012 | Leeser | 701/124 |
| 8,322,477 B2 * | 12/2012 | Kamen et al. | 180/181 |
| 8,428,788 B2 * | 4/2013 | Takenaka et al. | 701/1 |
| 8,589,059 B2 * | 11/2013 | Doi | 701/124 |
| 8,688,303 B2 * | 4/2014 | Stevens et al. | 701/22 |
| 2006/0063137 A1 * | 3/2006 | Robbins | 434/61 |
| 2006/0097683 A1 * | 5/2006 | Hosoda et al. | 318/568.12 |
| 2011/0010013 A1 * | 1/2011 | Ruan et al. | 700/261 |
| 2011/0221160 A1 * | 9/2011 | Shaw | 280/205 |
| 2011/0264350 A1 * | 10/2011 | Doi | 701/90 |

FOREIGN PATENT DOCUMENTS

| | | |
|---|---|---|
| JP | 2007-168603 A | 7/2007 |
| JP | 2007-319991 A | 12/2007 |
| JP | 2010-47095 A | 3/2010 |

OTHER PUBLICATIONS

Korean Office Action dated Mar. 11, 2015 along with English-language translation.

* cited by examiner

INVERTED PENDULUM TYPE MOVING BODY HAVING VELOCITY PLANNING DEVICE

TECHNICAL FIELD

The present invention relates to an inverted pendulum type moving body having a velocity planning device.

BACKGROUND ART

As a conventional technology related to this technical field, there is Japanese Unexamined Patent Application Publication No. 2007-168603 (Patent Literature 1). As this conventional technology, there is a coaxial two-wheel moving truck that has a driving wheel, an operation part, an obstacle detection part, and a control part for driving and controlling the driving wheel, and the moving truck is configured so that a stop instruction signal may be outputted to the control part by the operation part when the user instructs stop of the truck while this truck is in movement or by the obstacle detection part when existence of an obstacle is detected.

This control part is configured to set a value of a current vehicle velocity multiplied by −1 as a target vehicle velocity and to drive the driving wheel at the number of revolution according to the target vehicle velocity based on the stop instruction signal. For this reason, a force will be applied to the vehicle body in a direction opposite to its traveling direction, and a braking distance at the time of stop becomes short. Moreover, the target vehicle velocity is made to vary so as to approach zero sequentially until the vehicle body stops. Since the target vehicle velocity can be varied while the posture of the vehicle body is controlled by this control part, emergency stop of the vehicle body in a stable posture is made possible.

Moreover, there is Japanese Unexamined Patent Application Publication No. 2007-319991 (Patent Literature 2). In this conventional technology, described is a moving robot that has a moving mechanism with left and right wheels and a traveling motor for driving these wheels to rotate and a control device for controlling an upper body supported by this moving mechanism and the moving mechanism.

This control unit has a travel target generation part for generating multiple time series target values, and this travel target generation part is configured to generate a time series values of a characteristic point that is a linear sum of a position and an inclination of the moving robot located above a grounding point of the moving robot in such a way to fulfill a moving condition to the multiple time series target values.

CITATION LIST

Patent Literature

Patent Literature 1: Japanese Unexamined Patent Application Publication No. 2007-168603
Patent Literature 2: Japanese Unexamined Patent Application Publication No. 2007-319991

SUMMARY OF INVENTION

Technical Problem

Since the inverted pendulum type moving body is small in its base area, a case of being used as a moving body on which a human being rides, a case of being used as a truck for carrying things, such as a service robot, etc. are conceivable. Thus, the inverted pendulum type moving body is expected to play an active part in all environments while coexisting with human beings.

It is important for the inverted pendulum type moving body operating near the human beings to recover its posture rapidly against disturbance of the posture caused by rushing out and contact of something from a corner of a walk and impact at the time of stepping over a level difference and to stop in a shortest distance to ensure safety.

However, since the technology of Patent Literature 1 does not take into consideration a maximum torque of the driving wheel and the inverted pendulum type moving body does not necessarily reach a maximum acceleration, it is difficult to stop in the shortest distance. Moreover, when an excessive acceleration is required, it may result in turnover.

Moreover, although the technology of Patent Literature 2 performs a movement plan that considers the maximum torque, it is impossible to perform a plan from during acceleration/deceleration in a state of disturbed posture. Therefore, under a situation where velocity change is difficult during movement and disturbance of the posture, such as the emergency stop, is anticipated, it may be unable to be utilized. Moreover, since the maximum acceleration is not maintained, it is also difficult to stop in the shortest distance.

The object of the present invention is to provide an inverted pendulum type moving body that makes possible velocity change including a safe emergency stop even from a situation where its posture is disturbed during the acceleration/deceleration and during stepping over a level difference.

Solution to Problem

The above-mentioned object is attained in an inverted pendulum type moving body that has; a pair of wheels that is suspended from a body of the moving body, uses a floor as a traveling plane, and is provided vertically to its traveling direction; a driving mechanism for rotating these wheels; posture measuring means for measuring an upper body angular velocity that a straight line connecting a center-of-gravity position of the body of the moving body and the axle of the one pair of wheels makes with a vertical direction; and a mechanism control part for maintaining an inverted state of the body of the moving body by controlling the driving mechanism, by providing a velocity planning device for, when a need to change the velocity arises during a movement of the moving body, performing the movement plan so that the upper body angular velocity and the upper body angle may be in a relationship of quadratic function.

Moreover, for the above-mentioned object, it is desirable for the moving body to have a velocity planning device for, when the need to change the velocity arises during the movement of the moving body, performing a movement plan so that the upper body angular velocity and the upper body angle may be in the relationship of quadratic function after generating a fixed wheel driving force.

Moreover, for the above-mentioned object, it is desirable to have a velocity planning device for planning target values such that the upper body angle is non-zero and the upper body angular velocity is zero for a fixed time.

Moreover, for the above-mentioned object, it is desirable to have a velocity planning device that does not output values such that the upper body angle is zero and the upper body angular velocity is zero as target values until the velocity change is completed when the velocity is changed.

Advantageous Effects of Invention

According to the present invention, the inverted pendulum type moving body that makes possible velocity change including safe emergency stop even from a situation where its posture is disturbed during acceleration/deceleration and stepping over a level difference.

DESCRIPTION OF EMBODIMENTS

Hereinafter, one embodiment of the present invention will be described along with drawings.

First Embodiment

Figure 1:
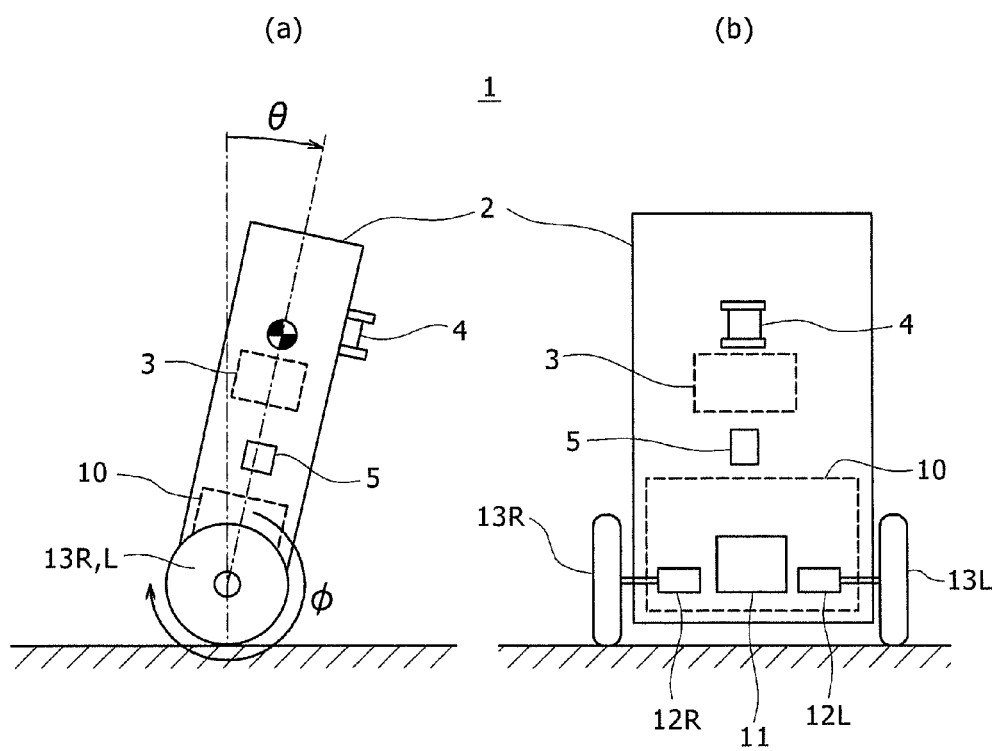
FIG. 1 is an outline configuration diagram of an inverted pendulum type moving body to which the present invention is directed.
Figure 1:

A mechanism configuration of an inverted pendulum type moving body 1 of this the embodiment will be explained referring to FIG. 1. FIG. 1A is a side view for explaining the mechanism configuration of the inverted pendulum type moving body 1 of this the embodiment, and FIG. 1B is a front view of the inverted pendulum type moving body 1.

In FIGS. 1A and 1B, the inverted pendulum type moving body 1 is roughly comprised of a moving mechanism 10 and an upper body 2. The moving mechanism 10 has a pair of right and left wheels 13R, L on the same axle, a mechanism control part 11, and motors 12R, L, and the wheels 13R, L are connected to the respectively independent motors 12R, L. The motors 12R, L are connected to the mechanism control part 11, and are controlled to generate a prescribed torque. A rotation angle and a rotational angular velocity of the wheels 13R, L are acquired by the mechanism control part 11 through the motors 12R, L.

The upper body 2 is provided over the moving mechanism 10. The upper body 2 has a computer 3 for performing an arithmetic operation described later, an environment sensor 4 for measuring a surrounding situation, and a posture sensor 5 for measuring an inclination angle θ that a straight line connecting a center-of-gravity position and the axle of the inverted pendulum type moving body 1 except for the wheels 13R, L and the axle makes with the vertical direction and an inclination angular velocity dθ. The computer 3 and the moving mechanism 10 are connected so that information exchange can be performed.

Figure 2:
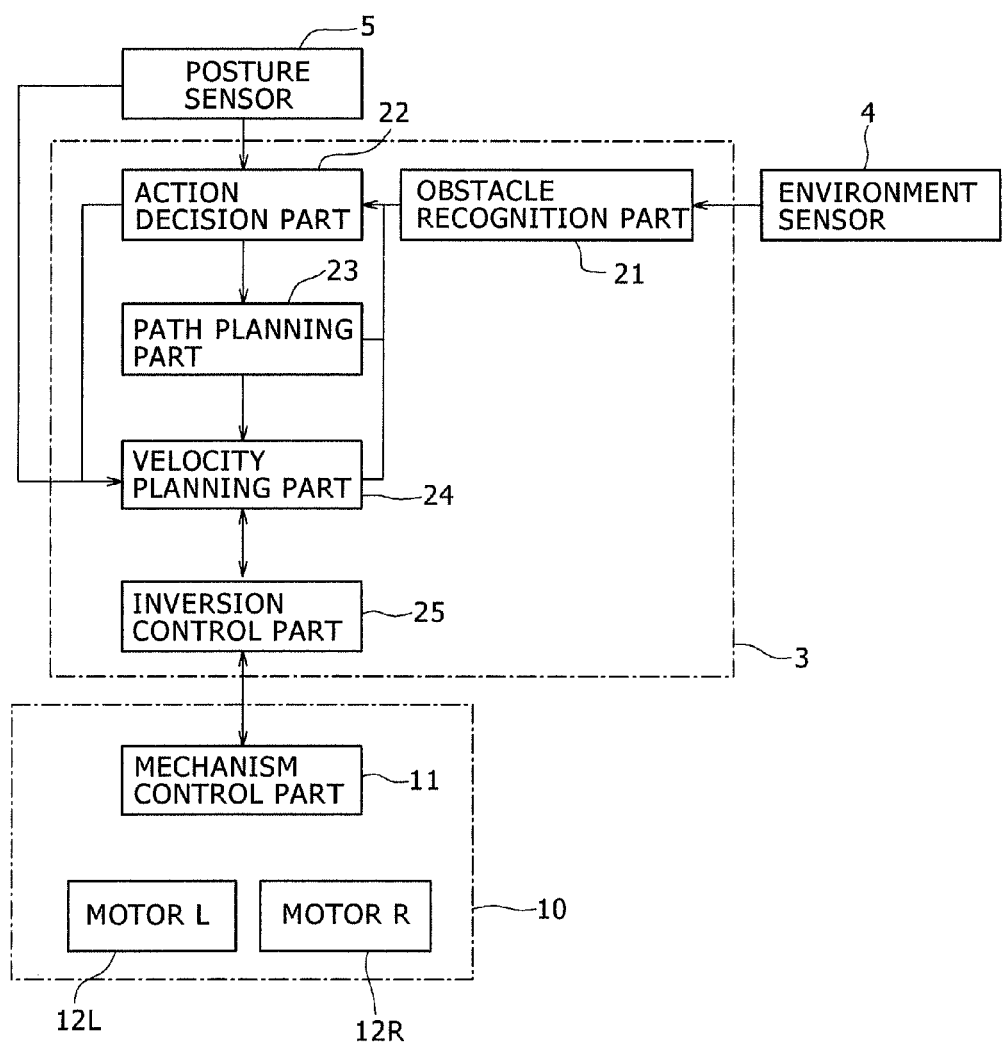
FIG. 2 is a flowchart showing a system configuration of the inverted pendulum type moving body to which the present invention is directed.

Next, a system configuration of the inverted pendulum type moving body 1 will be described using FIG. 2. FIG. 2 is a flowchart showing the system configuration of the inverted pendulum type moving body to which the present invention is directed.

In FIG. 2, the computer 3 has an obstacle recognition part 21, an action decision part 22, a path planning part 23, a velocity planning part 24, and an inversion control part 25. The computer 3 is connected to the environment sensor 4, the posture sensor 5, and the moving mechanism 10. The environment sensor 4 is a sensor for observing a situation outside the inverted pendulum type moving body 1, and can measure a distance to a surrounding object two-dimensionally or three-dimensionally, for example, by using a laser scanner. Moreover, the distance to the surrounding object can be similarly recognized, for example, by using a stereo camera. The posture sensor 5 is configured, for example, by using a gyro sensor, and thereby can measure the inclination angle θ and the inclination angular velocity dθ of the upper body 2. The obstacle recognition part 21 corrects the distance to the surrounding object acquired from the environment sensor 4 using the inclination angle θ obtained from the posture sensor 5, i.e., by multiplying it with cos θ, and calculates the position, the velocity, and the shape of the obstacle.

As a computation technique of an obstacle, there is the following method, for example (for example, a method of Japanese Unexamined Patent Application Publication No. 2008-65755).

By this method, first, a rapid change point to an angle of a distance value acquired by the laser scanner at a certain time t is detected, and a data row is divided for every cloud of continuous points to obtain several segments. By this, feature quantities, such as a representative position of a center of gravity of each segment at time t, a shape, etc. are obtained. Next, the calculation is performed similarly at time t+Δt to obtain feature quantities of each segment. Here, the feature quantities of the segment obtained at time t and the feature quantities of the segment obtained at time t+Δt are compared, the segments whose feature quantities are close to each other are considered the same obstacle, and a velocity of the obstacle is calculated from a variation of the representative position. Moreover, a shape of the obstacle is calculated from a data row that is recognized to be of the same obstacle and center coordinates of a circle inscribed in the obtained shape are calculated. Moreover, an obstacle whose moving velocity is almost zero is considered a still obstacle, and each data point by the laser scanner is considered an obstacle of zero width. Moreover, since the above-mentioned processing is executed for every segment, multiple obstacles can also be recognized. The obstacle recognition part 21 calculates positions, velocities, and shapes of a single or multiple obstacles by performing the above processing.

The action decision part 22 decides a behavior of the inverted pendulum type moving body 1 from the followings: a position, a velocity, and a shape of the obstacle acquired from the obstacle recognition part 21; the inclination angle θ and the inclination angular velocity dθ acquired from the posture sensor 5; a path plan acquired from the path planning part 23; and a velocity plan acquired from the velocity planning part 24.

Below, an action decision processing in the action decision part 22 will be explained with FIG. 3 and FIG. 4.

Figure 3:
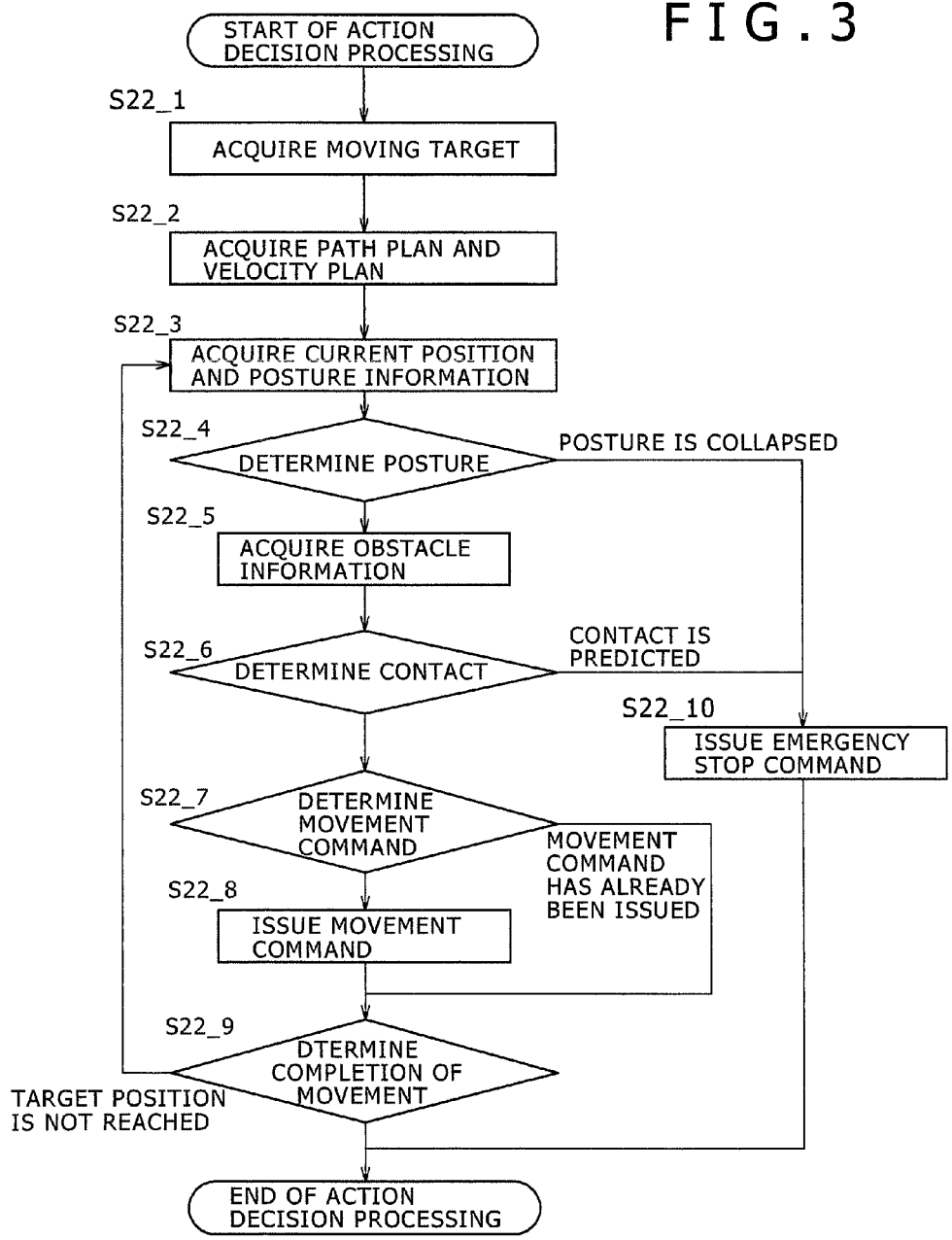
FIG. 3 is a flowchart for explaining a processing of an action decision part according to the embodiment of the present invention.

FIG. 3 is a flowchart for explaining the processing of the action decision part according to the embodiment of the present invention.

Figure 4:
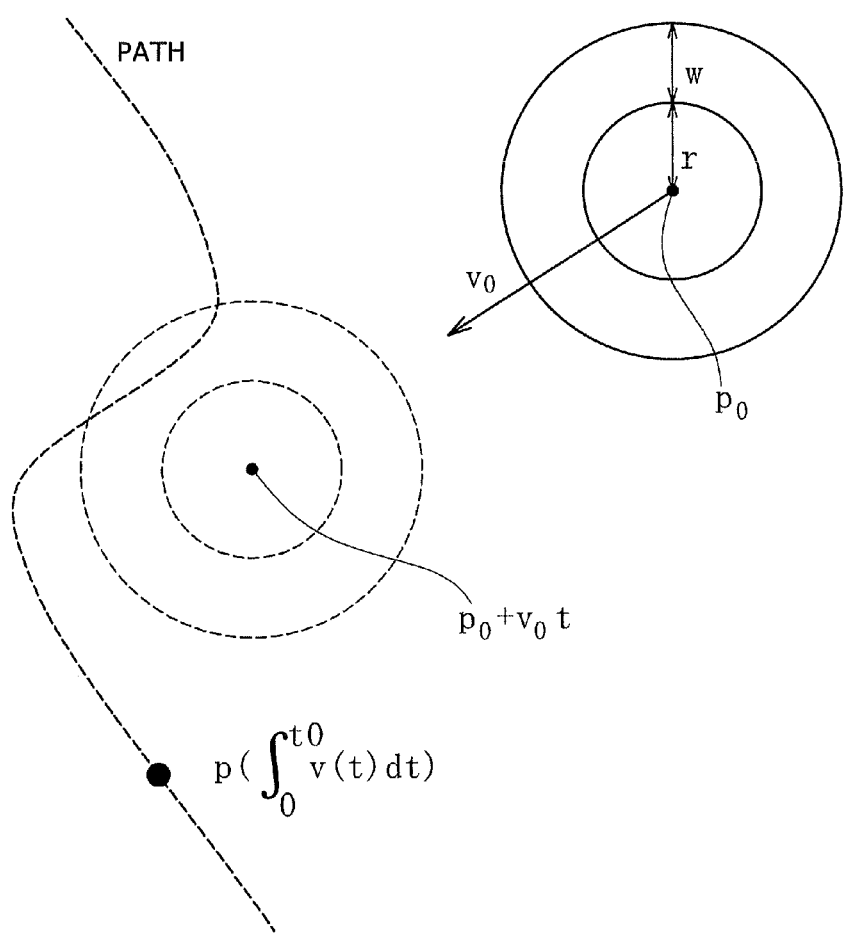
FIG. 4 is a diagram showing contact determination with an obstacle by the action decision part according to the embodiment of the present invention.

FIG. 4 is a diagram for explaining contact determination with the obstacle by the action decision part according to the embodiment of the present invention.

In FIG. 3, the action decision part 22 acquires a moving target that is set up in advance, or is decided by a program, or is inputted by a human being by S22_1. The moving target includes a movement destination position pr, a movement destination turning direction ωr, a maximum moving velocity vr, and a motor maximum torque τr.

In S22_2, the action decision part 22 transmits the moving target together with an examination command to the path planning part 23, and acquires the path plan and the velocity plan from the path planning part 23 and the velocity planning part 24. An internal processing of the path planning part 23 and the velocity planning part 24 will be described later.

In S22_3, the action decision part 22 acquires the inclination angle θ and the inclination angular velocity dθ from the posture sensor 5, and acquires a current position p of the inverted pendulum type moving body 1 from the inversion control part 25 through the velocity planning part 24.

In S22_4, the action decision part 22 judges whether the posture of the inverted pendulum type moving body 1 is collapsed using Formula 1.

[Formula 1]

$$|\theta| > \theta 1u \cup (d\theta > d\theta u \cap \theta > \theta 2u) \cup (d\theta < d\theta u \cap \theta < \theta 2u)$$ (Formula 1)

However, θ1u, dθu, and θ2u are constants decided with characteristics of the inverted pendulum type moving body 1, and are θ1u>0, dθu>0, and θ2u>0. When Formula 1 is true, the action decision part 22 advances the processing to S22_10, and when in the other case, it advances the processing to S22_5.

In S22_5, the action decision part 22 acquires a position po, a velocity vo, and a radius r from the obstacle recognition part 21 by approximating its shape with a circle.

In S22_6, the action decision part 22 determines whether the inverted pendulum type moving body 1 and the obstacle make contact from information of the obstacle acquired by S22_5 and the path plan and the velocity plan acquired by S22_5. In order to determine the contact, for example, designating the velocity at time t of the inverted pendulum type moving body 1 as v(t), finding the position by a function p(∫v(t)dt) using a velocity from a current time to a time after t0 seconds as an argument along the path plan, and assuming a shape of the inverted pendulum type moving body 1 as a circle of a radius w like the obstacle, as shown in FIG. 4, the contact between the inverted pendulum type moving body 1 and the obstacle is predicted by Formula 2.

[Formula 2]

$$r + w > \|p(\int_0^{t0} v(t)dt) - (p_o + v_o t_0)\|$$ (Formula 2)

When Formula 2 is false, the action decision part 22 determines that there occurs no contact between the inverted pendulum type moving body 1 and the obstacle and advances the processing to S22_7. When Formula 2 is true, the action decision part 22 advances the processing to S22_10.

In S22_7, the action decision part 22 determines whether a movement command is issued after the moving target is acquired in S22_1, and when the movement command is not issued, in S22_8, the action decision part 22 sends the moving target and the movement command issued by S22_2 to the path planning part 23 and the velocity planning part 24, and further advances the processing to S22_9. When the movement command has been issued, the action decision part 22 advances the processing to S22_9.

In S22_S22_9, the action decision part 22 compares the moving target acquired by S22_3 and the current position p acquired by S22_1 using Formula 3.

[Formula 3]

$$\epsilon > \|p_r p\|$$ (Formula 3)

Here, ϵ is a constant set up in advance. When Formula 3 is true, the action decision part 22 completes the movement decision processing. When Formula 3 is false, the action decision part 22 returns the processing to S22_3 and repeats the processing.

In S22_10, the action decision part 22 issues an emergency stop command to the path planning part 23, and terminates the processing. The path planning part 23 acquires the moving target from the action decision part 22, and generates a path. The path generation method connects the current position p acquired from the moving mechanism 10 through the traveling planning part 24 and the movement destination position pr with a straight line. Moreover, when the targeted turning direction ωr differs from the current turning direction ω at the movement destination position pr and the current position p, the Bezier curve or the spline curve that connect smoothly the current position p and the movement destination position p may be designated as the path. Moreover, the path planning part transmits generated path information to the action decision part 22 and the velocity planning part 24 as a data group of position coordinates of points existing on the path, and transmits the examination command and the movement command acquired from the action decision part 22 to the velocity planning part 24.

The velocity planning part 24 generates the velocity plan by acquiring the followings: the moving target from the action decision part 22; the path plan from the path planning part 23; the inclination angle θ and the inclination angular velocity dθ of the upper body from the posture sensor 5; and the wheel velocity dφ from the moving mechanism 10 through the inversion control part 25. Moreover, it transmits the generated velocity plan and the acquired path plan to the inversion control part 25.

Below, a velocity plan processing in the velocity planning part 24 will be described using a flowchart of FIG. 5. Moreover, details of the processing S24_7 in the flowchart of FIG. 5 will be described using a flowchart of FIG. 7.

Figure 5:
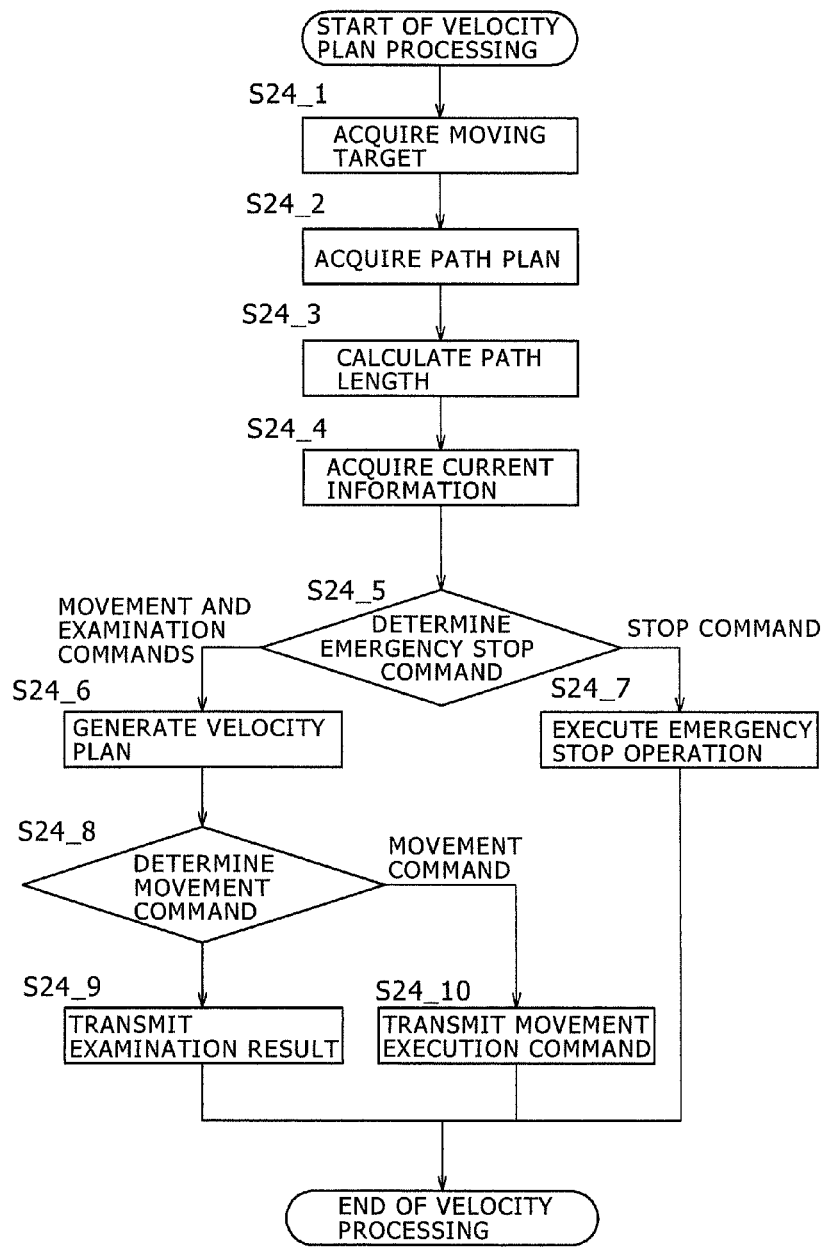
FIG. 5 is a flowchart for explaining a processing of a velocity planning part according to the embodiment of the present invention.

FIG. 5 is the flowchart for explaining a processing of the velocity planning part according to the embodiment of the present invention.

Figure 6:
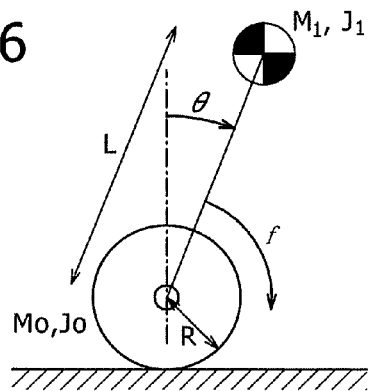
FIG. 6 is a diagram showing an example of modeling of the inverted pendulum type moving body according to the embodiment of the present invention.

FIG. 6 is a diagram showing an example of modeling of the inverted pendulum type moving body according to the embodiment of the present invention.

In S24_1 of FIG. 5, the velocity planning part 24 acquires the moving target and the movement command or the examination command from the action decision part 22. In S24_2, the velocity planning part 24 acquires the path information from the path planning part 23. In S24_3, the velocity planning part 24 calculates a movement length l from the acquired path information. Computation of the movement length l is calculated according to Formula 4 because the path information is a data group of position coordinates comprised of n points.

[Formula 4]

$$1 = \sum_{i=1}^{n-1} \|h_{i+1} \quad h_i\| \qquad \text{(Formula 4)}$$

Here, hi (i=1, ..., n) represents an individual point of the path information.

In S24_4, the velocity planning part 24 acquires the inclination angle θ and the inclination angular velocity dθ of the upper body from the posture sensor 5, and acquires the wheel angular velocity dφ and the current position from the inversion control part 25.

In S24_5, the velocity planning part 24 judges whether the emergency stop command is acquired from the action decision part 22. When the emergency stop command is not acquired, it advances the processing to S24_6; when being acquired, it advances the processing to S24-7.

In S24_6, the velocity planning part 24 generates the velocity plan based on the maximum moving velocity vr extracted from the moving target, the motor maximum torque τr, the calculated movement length l, and the inclination angle θ and the inclination angular velocity dθ acquired from the attitude sensor. The velocity plan is generated according to an equation of motion of the inverted pendulum type moving body 1. A model for computation of the equation of motion is shown in FIG. 6 and a calculated equation of motion is shown in Formulae 5.

[Formulae 5]

$$\begin{cases} S\ddot{\varphi} + T\ddot{\theta} = \tau \\ U\ddot{\varphi} + V\ddot{\theta} = \theta \end{cases} \qquad \text{(Formulae 5)}$$

$$S = J_o + (M_0 + M_1)R^2$$
$$T = J_0 + (M_0 + M_1)R^2 + LM_1 R$$
$$U = (J_0 + (M_0 + M_1)R^2 + LM_1 R)/(gLM_1)$$
$$V = (J_0 + J_1 + M_1 L^2 + (M_0 + M_1)R^2 + 2LM_1 R)/(gLM_1)$$

Here, designations are as follows: R, a radius of the wheel 13; M0, a mass thereof; J0, a moment of inertia thereof; M1, a mass of a portion other than the wheel of the inverted pendulum type moving body 1; J1, a moment of inertia thereof; L, a distance between the center of gravity and an axle of the wheel 13; φ, a rotational angle of the wheel from a straight line including the center of gravity and the axle; dφ, a rotational angular velocity; and g, a gravitational acceleration.

Formulae 5 are based on the model shown in FIG. 6 and is linearized in the vicinity of θ=0 through a Lagrange's equation. Moreover, in order to make the formula simple, constant term portions were replaced with S, T, U, and V.

Furthermore, a relationship of the inclination angle θ, the inclination angular velocity dθ, the wheel angle φ, the wheel angular velocity dφ, and the motor torque τ that are quantities of state are obtained as in Formulae 6 by using a parameter q to Formulae 5.

[Formulae 6]

$$q = \varphi + \frac{V}{U}\theta \qquad \text{(Formulae 6)}$$
$$\varphi = q \quad V q^{(2)}$$
$$d\varphi = q^{(1)} \quad V q^{(3)}$$
$$\theta = U q^{(2)}$$
$$d\theta = U q^{(3)}$$
$$\tau = S q^{(2)} + (TU \quad SV) q^{(4)}$$

Here, q(i) [i=1, 2, and 3] represents an i-th differentiation of q. All the quantities of state can be designed by designing a fixed point q from Formulae 6. When the inverted pendulum type moving body 1 changes its velocity, it needs to temporarily move the wheels 13 to a reverse direction to a direction in which it intends to travel more than the upper body because of its dynamic characteristics. A rotation center of the whole of the inverted pendulum type moving body 1 at this time is q. As a design method of q, in the case where the inclination angle θ and the inclination angular velocity dθ at the time of start of movement and at the time of completion of movement can be regarded as zeros, the technology described in Patent Literature 2 can be used. At this time, q(4) takes any one of values of 0, k, and –k (k>0), q(i)(ts)=q(i)(te)=0 [i=1, 2, and 3] is derived on the condition that states at the time of start of movement (time ts) and at the time of completion of movement (time te) are stable, and q(4) is set up using the movement length l, the maximum moving velocity vr, and the motor maximum torque τr. All the quantities of state are designed by integrating the q(4) and converting it with a relationship of Formulae 6. A data row of the inclination angle θ, the inclination angular velocity dθ, the wheel angle φ, and the wheel angular velocity dφ that are along with a time series is generated as the velocity plan.

In S24_8, when the command acquired from the action decision part 22 is the examination command, the velocity planning part 24 advances the processing to S24_9; when the command is the movement command, it advances the processing to S24_10.

In S24_9, the velocity planning part 24 transmits the generated velocity plan to the action decision part 22, and terminates it.

In S24_10, the velocity planning part 24 transmits the generated velocity plan to the action decision part 22 and the inversion control part 25, and terminates it.

In S24_7, the velocity planning part 24 performs an emergency stop operation in which a current quantity of state is designated to be a start point, and terminates it. In this case, since states at the time of start of movement (time ts) and at the time of completion of movement (time te) are not stable, the method of Patent Literature 2 is unusable.

Figure 7:
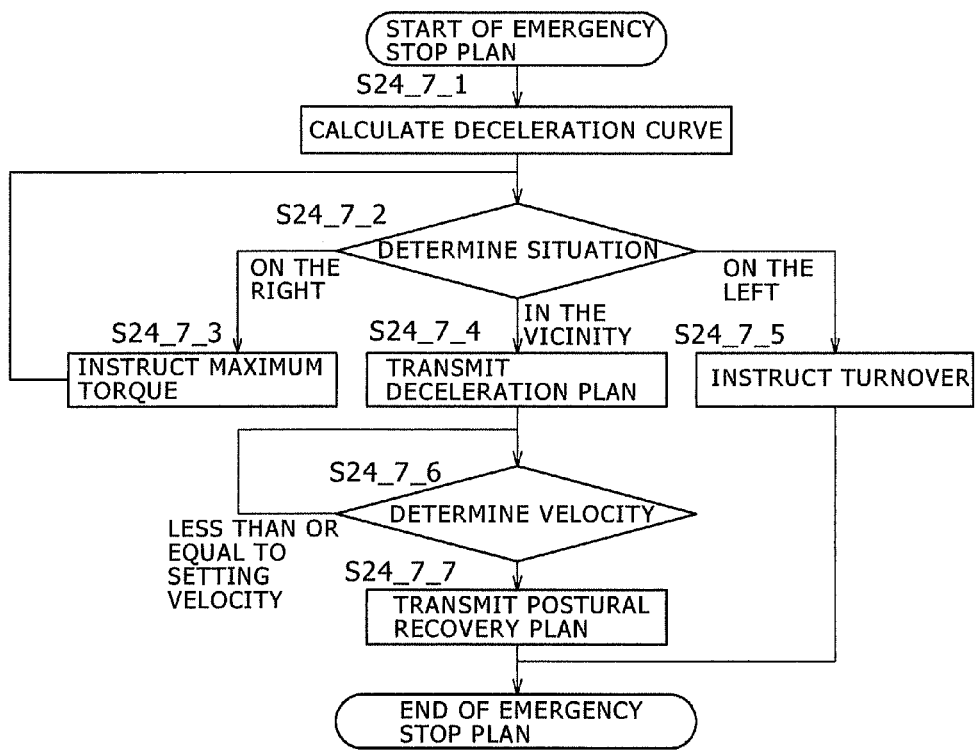
FIG. 7 is a flowchart showing an emergency stop operation processing of the velocity planning part according to the embodiment of the present invention.
Figure 8:
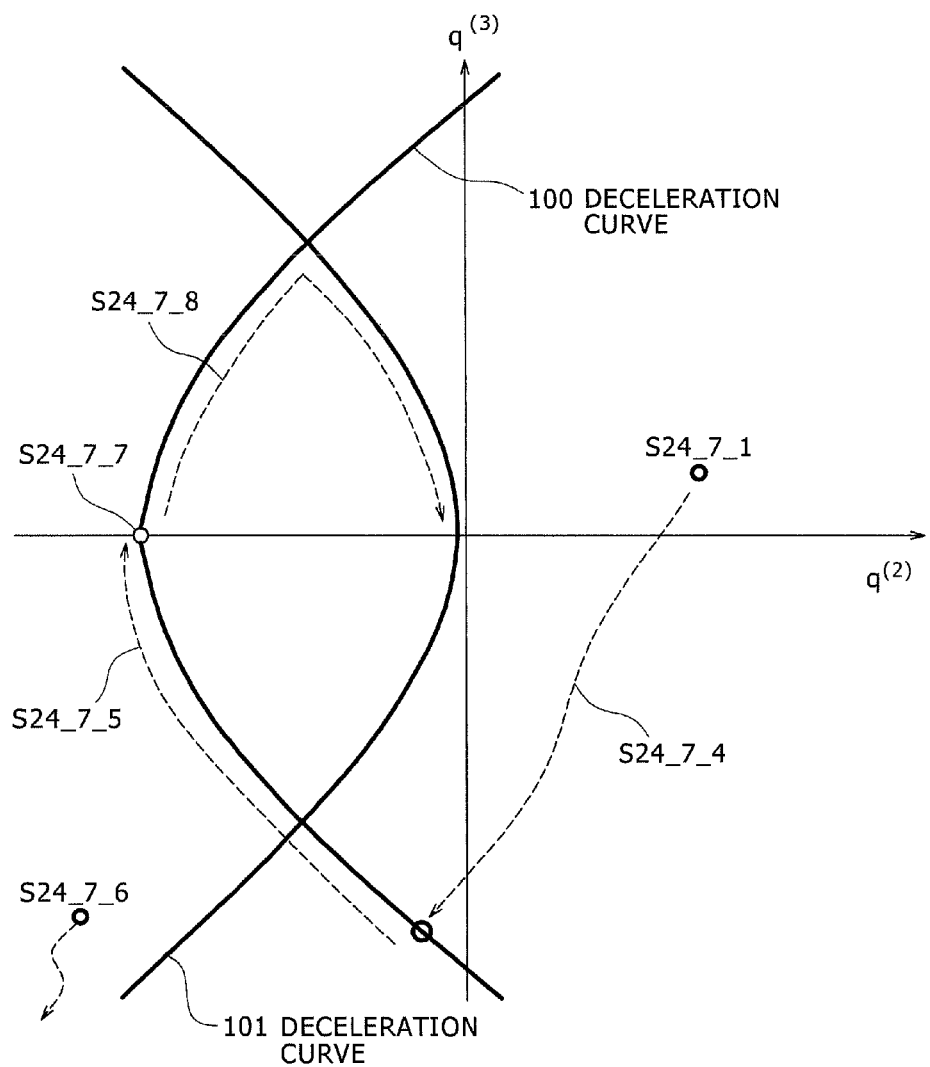
FIG. 8 is a diagram for explaining the emergency stop operation processing of the velocity planning part according to the embodiment of the present invention.

Then, a stop plan is drawn up using a flowchart shown in FIG. 7 and FIG. 8.

FIG. 7 is the flowchart showing an emergency stop operation processing of the velocity planning part according to the embodiment of the present invention.

FIG. 8 is a diagram for explaining the emergency stop operation processing of the velocity planning part according to the embodiment of the present invention.

FIG. 8 is a graph with $q^{(2)}$ taken along the horizontal axis and $q^{(3)}$ taken along the vertical axis, these parameters show a relationship between the acceleration of the inverted pendulum type moving body 1 and a rate of change of the acceleration.

In FIG. 7 and FIG. 8, although a period from a time when the wheel velocity dφ is positive to a time when it is decelerated to zero is treated in this embodiment, by making the sign suitable, even in the case where the wheel velocity dφ is negative, it can be accelerated to zero.

In S24_7_1, the velocity planning part 24 calculates the deceleration curve 101 expressed by Formula 7 in which k is set to a constant and the deceleration curve 100 expressed by Formula 8.

[Formula 7]

$$q^{(2)} = \frac{1}{2k}(q^{(3)})^2 \quad \text{(Formula 7)}$$

[Formula 8]

$$q^{(2)} = -\frac{1}{2k}(q^{(3)})^2 + C \quad \text{(Formula 8)}$$

In Formulae 7 and 8, k (>0) is time-invariant and common, is equal to an absolute value of $q^{(4)}$, and is calculated by using, for example, a relationship of dφ that is obtained with the maximum motor torque τr, the maximum moving velocity vr, and the radius of the wheel 13 and Formulae 6. $q^{(4)}$ takes either value of k or −k (k>0) when the torque is not directly specified by the plan. Moreover, if k, namely an absolute value of $q^{(4)}$, is decided from Formulae 6, the maximum motor torque τr will be in a relationship of a linear function of the maximum upper body inclination angle θ. Using this, C is computable by solving the above-mentioned linear function for the case of $q^{(3)}=0$ where the absolute value of θ becomes a maximum when the absolute value of the required motor torque becomes a maximum. By following the plan that is along with this deceleration curve, the inverted pendulum type moving body 1 can make a maximum deceleration and stop from an arbitrary posture even after the motors 12 is driven with the maximum motor torque.

In S24_7_2, the velocity planning part 24 acquires the inclination angle θ and the inclination angular velocity dθ from the posture sensor 5, converts them into q(2) and q(3) using the relationship of Formulae 6, respectively, and determines whether the point is on the right of the deceleration curve 100 in FIG. 8 or on the left. When it is on the right of the deceleration curve 100, the processing is advanced to S24_7_3; when it is in the vicinity of the deceleration curve 100, the processing is advanced to S24_7_4; and when it is sufficiently on the left thereof, the processing is advanced to S24_7_5.

In S24_7_3, the velocity planning part 24 sends an instruction to the inversion control part 25 so that the motor torque τ may become the motor maximum torque τr, and returns the processing to S24_7_2. As shown in FIG. 8, during S24_7_3, a state of the inverted pendulum type moving body 1 moves in a lower left direction.

In S24_7_4, the velocity planning part 24 acquires the wheel angular velocity dφ, the inclination angle θ, and the inclination angular velocity dθ from the posture sensor 5 and the mechanism control part 11 through the inversion control part 25, and generates $q^{(i)}$ [i=1, 2, and 3] by converting these quantities of state using the relationship of Formulae 6. By setting $q^{(4)}$ as $q^{(4)}=4$ to the obtained $q^{(i)}$, with the relationship of Formulae 6 and by integrating $q^{(4)}$, the velocity planning part 24 generates the velocity plan that is along with the deceleration curve 100 and transmits a portion of it that comes to the inclination angular velocity $dθ=q^{(3)}=0$ to the inversion control part 25. When the inclination angular velocity dθ becomes $dθ=q^{(3)}=0$, the processing is advanced to S24_7_7.

As shown in FIG. 8, during S24_7_4, the state of the inverted pendulum type moving body 1 moves along the deceleration curve 100.

In S24_7_5, the velocity planning part 24 sends an instruction to the inversion control part 25 so that the motor torque τ may become zero, makes the inverted pendulum type moving body 1 turn over, and terminates the movement.

In S24_7_6, in a plan that decelerates the moving body according to the deceleration curve 100 like S24_7_4 and further decelerates it along the deceleration curve 101 after setting $q^{(4)}=−k$ at a cross point of the deceleration curve 100 and the deceleration curve 101, when $q^{(2)}=q^{(3)}=0$ comes to hold, the velocity planning part 24 determines whether the wheel angular velocity dφ becomes zero. When the determination result is false, the velocity planning part 24 keeps deceleration and performs a loop processing by maintaining the target inclination angle and the target inclination angular velocity until the determination result becomes true. When the determination result is true, the velocity planning part 24 advances the processing to S24_7_7, and transmits the deceleration plan whose determination result becomes true to the inversion control part 25, and terminates the processing.

The inversion control part 25 transmits an instruction for controlling the motors 12R, L to the mechanism control part 11 based on a plan or a torque direction sent from the velocity planning part 24 and the rotation angle φR, L and the rotational angular velocity dφR, L of the wheels 13R, L acquired from the moving mechanism 10. In the case where the reception is performed as the plan, a target value corresponding to the current time is used according to a time series of the plan. Moreover, it calculates a current position p(t0) of the inverted pendulum type moving body 1. A computation method of the position at a current time t0 is based on Formulae 9.

[Formula 9]

$$p(t_0) = (\int_0^{t_0} v(t)\cos ω(t)dt, \int_0^{t_0} v(t)\sin ω(t)dt)$$

$$v(t) = (dφ_R(t) + dφ_L(t))/2$$

$$ω(t) = \int_0^{t_0} dω(t)dt$$

$$dω(t) = R(dφ_L(t) − dφ_R(t))/f \quad \text{(Formula 9)}$$

t represents time, and the wheel angle φR, L and the rotational angular velocity dφR, L are described with functions of t. Moreover, f is an interval of the wheels 13R and 13L.

When the plan acquires the quantity of state from the velocity planning part 24 as a target, a motor torque τS for translation according to Formula 10 is calculated.

[Formula 10]

$$τ_s = [K_1 \; K_2 \; K_3 \; K_4] \begin{bmatrix} θ − θ_r \\ φ − φ_r \\ dθ − dθ_r \\ dφ − dφ_r \end{bmatrix} \quad \text{(Formula 10)}$$

Here, $K_{(i)}$ [i=1, 2, 3, and 4] is a scalar quantity, and can be designed heuristically or by means of LQR and H∞ control theory. Moreover, θr, dθr, φ, and dφ are an upper body angle target value, an upper body angular velocity target value, a wheel angle target value, and a wheel angular velocity target value, respectively. Moreover, φ is an average of wheel rotation angles φR, L, and dφ is an average of wheel rotational angular velocities dφR, L. When the wheel rotation angle φr is not specified like at the time of the emergency stop operation, a portion related to the wheel rotation angle is disregarded. When a maximum torque instruction or a turnover instruction is received from the velocity planning part 24, the acquired motor torque target value is transmitted to the mechanism control part 11 as it is.

A method of computing a rotation motor torque τc for following the path plan will be described. The path plan is data of a point group on the path as described above, and is represented by h[i] (i=1, 2, . . . n). The inversion control part 25 calculates a distance H from a point h[j] on the path plan that is nearest to the current position to a point h[j]. Next, a target turning direction ωr at the point h[j] and its turning radius η are calculated using points h[j+1], h[j−1] that are before and after the point h[j] on the path plan. Next, the present target moving velocity vr is divided by the turning radius η to obtain the target rotational angular velocity dωr. According to Formula 11, the motor torque τc for turning is calculated using the above.

[Formula 11]

$$\tau_c = [K_5 \ K_6 \ K_7] \begin{bmatrix} \omega_r - \omega \\ d\omega_r - d\omega \\ H \end{bmatrix} \quad \text{(Formula 11)}$$

However, $K_{(i)}$ [i=5, 6, and 7] is a scalar quantity and can be designed heuristically or by means of the various control theories as described above. The inversion control part 25 transmits a sum of τs and τc as a torque that the motor 12L is made to output to the mechanism control part 11, and transmits a difference of τs and τc as a torque that the motor 12R is made to output.

When the moving mechanism 10 receives the stop command, the mechanism control part 11 controls so that the motors 12R, L may not output a torque. Moreover, it measures the angle and the angular velocity of the wheels 13R, L through the motors 12R, L and transmits them to the inversion control part 25.

Figure 9:
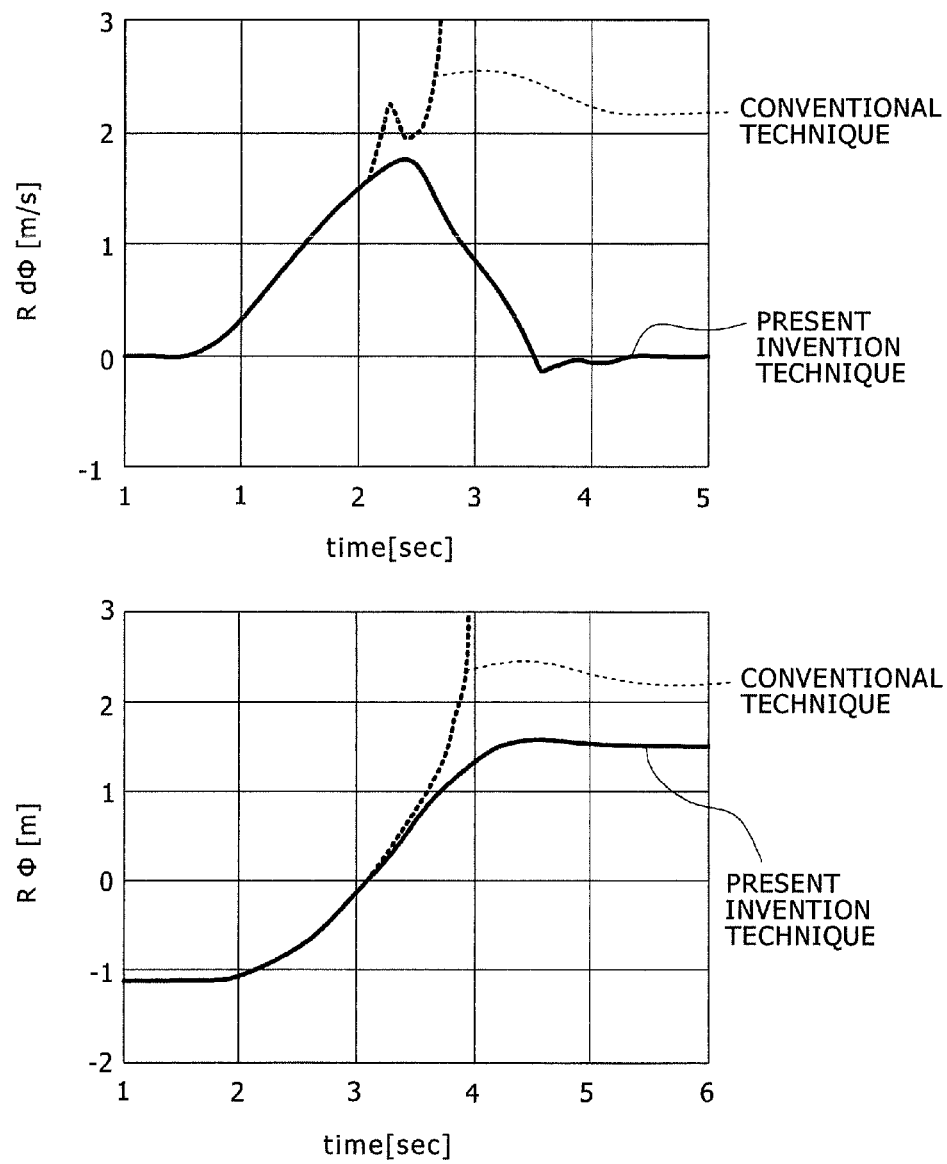
FIG. 9 is a graph chart showing a simulation result of an effect according to the embodiment of the present invention.

The inverted pendulum type moving body 1 configured as above can stop by maximum acceleration=maximum motor torque even from a state where the posture was disturbed. Moreover, since acceleration does not come to zero in the middle of the operation, a scene where the upper body inclination angle and the upper body inclination angular velocity to the target values become zeros does not exist except for a point of termination of the plan. FIG. 9 shows a behavior by simulation when the emergency stop operation of the inverted pendulum type moving body 1 that is configured in this embodiment is performed.

FIG. 9 is graph charts showing simulation results of an effect according to the embodiment of the present invention.

In FIG. 9, an example where the emergency plan of this embodiment is performed during acceleration of the inverted pendulum type moving body 1 is represented by a solid line, and the emergency stop plan only with the wheel angular velocity dφ, the inclination angle θ, and the inclination angular velocity dθ set to zero is represented by a broken line. Whereas the conventional technique cannot support a rapid target value change, resulting in turnover, the technique of this embodiment succeeds in velocity change and succeeds in stop.

Second Embodiment

Although in the first embodiment, the emergency stop where the velocity was reduced to zero during forward movement was shown, the present invention can also be applied to a case where the velocity is reduced to zero during backward movement, or a case where the current velocity is changed to an arbitrary velocity. Moreover, although the processing was advanced based on the acquired current information in the example of the first embodiment, for example, in S24_7_2 and S24_7_6, simulation may be performed based on a situation at the time of start of the plan to decide a timing, and the entire plan may be generated in advance.

Third Embodiment

Although, in the first embodiment, the path was generated in the path planning part 23, a path set up in advance like the action decision part 22 may be acquired or path information may be acquired directly from the outside. Moreover, when transmitting the path plan to the velocity planning part 24, path plan information may be transmitted as a function with a time as a parameter or as a data group in which a time and coordinates are coupled, not transmitting data of the coordinates.

Fourth Embodiment

Although in generation of the emergency stop operation of the first embodiment, it is presupposed that the stop is made with the maximum acceleration, when a velocity after the change has a small difference from the current velocity that is before the change, a suitably small acceleration may be used not using the maximum acceleration. Moreover, it is not necessary to use the maximum torque also in S24_7_3 where the posture is moved to the deceleration curve.

Fifth Embodiment

Although in the first embodiment, it is presupposed that the inclination angle of the upper body is acquired from the posture sensor, the posture sensor may measure only the inclination angular velocity and the computer may find the inclination angle by integrating the inclination angular velocity after acquiring it.

LIST OF REFERENCE SIGNS

1 . . . Inverted pendulum type moving body
2 . . . Upper body
3 . . . Computer
4 . . . Environment sensor
5 . . . Posture sensor
10 . . . Moving mechanism
11 . . . Mechanism control part
12 . . . Motor
13 . . . Wheel

The invention claimed is:

1. An inverted pendulum type moving body comprising:
a pair of wheels that is suspended from a body of the moving body, uses a floor as a traveling plane, and is provided on the same plane vertical to its traveling direction; a driving mechanism for rotating these wheels;
a posture sensor that measures an inclination angular velocity of its upper body that a straight line connecting a center of gravity of the body of the moving body and an axle of the one pair of wheels makes with a vertical direction;
a mechanism control part that maintains an inverted state of the body of the moving body by controlling the driving mechanism; and a computer including a velocity planning part that, when a need to change a velocity arises during a movement of the moving body, performs a movement plan so that the inclination angular velocity of the upper body and an inclination angle of the upper body may be in a relationship of a quadratic function.

2. The inverted pendulum type moving body according to claim 1, a wherein the velocity planning part, when the need to change the velocity arises during the movement of the moving body, performs the movement plan so that the inclination angular velocity of the upper body and the inclination angle of the upper body may be in the relationship of the quadratic function after generating a fixed wheel driving force.

3. The inverted pendulum type moving body according to claim 1, wherein the velocity planning part plans target values such that the upper body inclination angle is non-zero and the upper body inclination angular velocity is zero for a fixed time.

4. The inverted pendulum type moving body according to claim 1, a wherein the velocity planning device, when changing the velocity, does not output values such that the upper body inclination angle is zero and the upper body inclination angular velocity is zero as target values until the velocity change is completed.

* * * * *